United States Patent

Miyoshi et al.

[11] Patent Number: 5,804,152
[45] Date of Patent: Sep. 8, 1998

[54] METHOD FOR PURIFYING EXHAUST GASES

[75] Inventors: Naoto Miyoshi, Nagoya; Hiromasa Suzuki, Kasugai; Osamu Ogawa, Toyota; Mareo Kimura, Nagoya; Yuzo Kawai, Nisshin; Koji Yokota; Naoki Takahashi, both of Nagoya; Toshiyuki Tanaka, Aichi-gun, all of Japan

[73] Assignees: Toyota Jidosha Kabushiki Kaisha, Toyota; Kabushiki Kaisha Toyota Chuo Kenkyusho, Aichi, both of Japan

[21] Appl. No.: 551,918

[22] Filed: Oct. 23, 1995

[30] Foreign Application Priority Data

Oct. 21, 1994 [JP] Japan .................................. 6-256976
Jan. 13, 1995 [JP] Japan .................................. 7-004396

[51] Int. Cl.$^6$ .................................................. B01D 53/94
[52] U.S. Cl. ...................................... 423/213.5; 423/239.1
[58] Field of Search .............................. 423/213.5, 239.1

[56] References Cited

U.S. PATENT DOCUMENTS

| | | | |
|---|---|---|---|
| 5,075,276 | 12/1991 | Ozawa et al. | 423/213.5 |
| 5,294,421 | 3/1994 | Muraki et al. | 423/213.5 |
| 5,388,406 | 2/1995 | Takeshima et al. | 423/212 |
| 5,412,945 | 5/1995 | Katoh et al. | 60/285 |

FOREIGN PATENT DOCUMENTS

| | | |
|---|---|---|
| 257983 | 3/1988 | European Pat. Off. . |
| 0370523 | 5/1990 | European Pat. Off. . |
| 0455491 | 11/1991 | European Pat. Off. . |
| 0507590 | 10/1992 | European Pat. Off. . |
| 0573672 | 12/1993 | European Pat. Off. . |
| 3913972 | 11/1989 | Germany . |
| 5-168860 | 7/1993 | Japan . |
| 5-317652 | 12/1993 | Japan . |
| 6-304476 | 11/1994 | Japan .................................. 423/248 |
| 94/25143 | 11/1994 | WIPO . |

*Primary Examiner*—Michael Lewis
*Assistant Examiner*—Peter DiMauro
*Attorney, Agent, or Firm*—Oliff & Berridge PLC

[57] ABSTRACT

An automotive exhaust catalyst includes a support, which is less likely to adsorb $SO_x$ contained in exhaust gases thereon, an $NO_x$ storage compound loaded on the support, and a noble metal element loaded on the support. The support is an alumina support with a Ti—Zr composite oxide loaded thereon, or is formed of a Ti—Zr or Ti—Zr—Y composite oxide. The composite oxide inhibits the $NO_x$ storage compound, which is selected from alkali metals, alkaline-earth metals and rare-earth elements, from being poisoned by sulfur, and enhances the thermal resistance of the support. Thus, the automotive exhaust catalyst can effectively purify $NO_x$ contained in lean-side exhaust gases, even after it is subjected to a thermal durability test.

18 Claims, No Drawings

METHOD FOR PURIFYING EXHAUST GASES

BACKGROUND OF THE INVENTION

1. Field of the Invention

The present invention relates to a catalyst for purifying exhaust gases. Specifically, it relates to the catalyst which can efficiently purify nitrogen oxides ($NO_x$) included in exhaust gases. More specifically, it relates to the catalyst which can efficiently purify $NO_x$ included in the exhaust gases whose oxygen concentrations are more than required for completely oxidizing reducing components, such as carbon monoxide (CO), hydrogen ($H_2$) and hydrocarbons (HC), included therein. In particular, it relates to an automotive catalyst which stores $NO_x$ therein in fuel-lean atmosphere, and which reduces $NO_x$ by $H_2$ and HC in fuel-rich atmosphere.

2. Description of Related Art

As catalysts for purifying automotive exhaust gases, there have been employed 3-way catalysts so far which oxidize CO and HC and simultaneously reduce $NO_x$. For example, the 3-way catalysts have been known widely which comprise a thermal resistant support formed of cordierite, a porous carrier layer formed of gamma-alumina and disposed on the support, and a noble metal element selected from the group consisting of platinum (Pt), palladium (Pd) and rhodium (Rh) loaded on the carrier layer. In particular, another 3-way catalyst has been known in which ceria (i.e., cerium oxide) is used together with the support, the carrier layer and the noble metal element of the former 3-way catalysts. Ceria has an oxygen storage capacity, and improves the light-off performance of the latter 3-way catalyst.

From the viewpoint of the global environment protection, carbon dioxide ($CO_2$), which is emitted from internal combustion engines of automobiles or the like, is at issue. In order to reduce the carbon dioxide, so-called lean-burn engines are regarded promising. In lean-burn engines, the air-fuel mixture is lean-burned in oxygen-rich atmosphere. The fuel consumption can be reduced because lean-burn engines consume the fuel less. Accordingly, the carbon dioxide, which is emitted from lean-burn engines as one of the burned exhaust gases, is inhibited from generating.

The conventional 3-way catalysts purify almost all CO, HC and $NO_x$ at the stoichiometric air-fuel ratio. However, the conventional 3-way catalysts do not have enough activity to remove $NO_x$ under the lean condition. Thus, it has been desired to successfully develop an automotive exhaust catalyst and a purifying system, which can purify $NO_x$ even under the lean condition.

Specifically, the activity of automotive exhaust catalysts depends greatly on the air-fuel ratio (A/F) of exhaust gases. For instance, when the A/F is larger than 14.6, i.e., when the fuel concentration to air is lower than the stoichiometric point (or on the fuel-lean side), the oxygen concentration is higher than the stoichiometric point in exhaust gases. In such conditions, the conversions of CO and HC are almost at the same level as in the stoichiometric condition, but the conversion of $NO_x$ is rapidly decreasing with increasing A/F. On the other hand, when the A/F is smaller than 14.6, i.e., when the fuel concentration to air is higher than the stoichiometric point (or on the fuel-rich side), the oxygen concentration is lower than the stoichiometric point in exhaust gases. In such conditions, the conversions of CO and HC are rapidly decreasing with decreasing A/F, but the conversion of $NO_x$ is almost at the same level as in the stoichiometric condition.

Moreover, when driving automobiles, especially when driving automobiles in urban areas, the automobiles are accelerated and decelerated frequently. Consequently, the air-fuel ratio varies frequently in the range of from the values adjacent to the stoichiometric point (air-fuel ratio: 14.6) to the fuel-rich side (i.e., in oxygen-lean atmosphere). In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, in view of the low fuel-consumption requirement, it has been also desired to develop a catalyst which is capable of adequately purifying $NO_x$ even on the fuel-lean side (i.e., in oxygen-rich atmosphere).

Under the circumstances, the applicants of the present invention filed the following patent applications with the Japanese Patent Office. For example, Japanese Unexamined Patent Publication (KOKAI) No. 5-317,652 discloses an automotive exhaust catalyst in which an alkaline-earth metal and Pt are loaded on a porous support including alumina, or the like. Japanese Unexamined Patent Publication (KOKAI) No. 5-168,860 discloses an automotive exhaust catalyst in which lanthanum (La) and Pt are loaded on a porous support. In these catalysts, during the fuel-lean side (i.e., in oxygen-rich atmosphere) driving, $NO_x$ is stored in the alkaline-earth metal and lanthanum. The alkaline-earth metal and lanthanum are hereinafter referred to as an $NO_x$ storage compound. During the stoichiometric-point driving or the transition area driving, which can be classified as the fuel-rich side (i.e., in oxygen-lean atmosphere) driving, the stored $NO_x$ reacts with the reducing agents such as HC, CO, etc. to be purified. As a result, these catalysts exhibit superb $NO_x$ purifying performance during the fuel-lean side (i.e., in oxygen-rich atmosphere) driving.

The catalyst, for instance, proposed in Japanese Unexamined Patent Publication (KOKAI) No. 5-317,652, is believed to provide the advantageous effect as follows; namely: the barium, one of the alkaline-earth metals, is loaded as simple carbonate on the support, and it reacts with $NO_x$ to produce barium nitrates, e.g., $Ba(NO_3)_2$. Thus, $NO_x$ is stored in the $NO_x$ storage compound as the barium nitrates.

However, the exhaust gases usually contain sulfur dioxide ($SO_2$) gas which is produced by burning sulfur element (S) contained in the fuel. Further, the catalyst ingredient oxidizes $SO_2$ to sulfur trioxide ($SO_3$) in oxygen-rich atmosphere (i.e., on the fuel-lean side). Still further, $SO_3$ reacts readily with water vapor, which is also contained in the exhaust gases, to produce sulfite ions and sulfate ions. The sulfite ions and sulfate ions react with the $NO_x$ storage compound to produce sulfites and sulfates. It has been revealed that the resulting sulfites and sulfates adversely affect the $NO_x$ storage reaction, which is effected by the $NO_x$ storage compound. As a result, the catalyst disclosed in the aforementioned Japanese Patent Publications might be poisoned by sulfur to possibly exhibit degraded purifying performance.

In particular, when the $NO_x$ storage compound is turned into sulfites and sulfates, the $NO_x$ storage compound can hardly store $NO_x$ therein. Consequently, the catalysts proposed in the aforementioned Japanese Unexamined Patent Publications might suffer from a drawback in that it exhibits the $NO_x$ purifying performance unsatisfactorily after it is subjected to a durability test.

In addition, the catalysts disclosed in the aforementioned Japanese Patent Publications employ activated alumina, which has a good adsorbing capability, as their support. The support made of activated alumina is also likely to adsorb $SO_x$ thereon. Accordingly, the catalysts might possibly be poisoned by sulfur facilitatively.

To solve the aforementioned problems, the inventors of the present invention thought of using a support formed of titania (i.e., titanium oxide), which is less likely to adsorb $SO_x$ thereon, and carried out a series of experiments. According to the experiments, the inventors found that $SO_x$ is less likely to be adsorbed on the support made of titania, and that $SO_x$ flows to a downstream side as it is. Thus, a catalyst including such a support was poisoned by sulfur to a lesser extent, because only the $SO_x$, which contacts with a noble mental catalyst ingredient directly, is oxidized. However, the inventors noticed that the catalyst including the support formed of titania has the following detrimental drawback; namely: it showed inferior initial catalytic activities, and it kept to exhibit unsatisfactory $NO_x$ purifying performance after it is subjected to a durability test.

SUMMARY OF THE INVENTION

The present invention has been developed in view of the aforementioned circumstances. It is an object of the present invention to provide an automotive exhaust catalyst, which can purify $NO_x$ at high conversion initially, whose $NO_x$ storage compound is inhibited from being poisoned by sulfur, and whose $NO_x$ purifying performance is kept from degrading even after it is subjected to a durability test. It is another object of the present invention to improve a support so as to be less likely to adsorb $SO_x$ thereon, thereby providing an automotive exhaust catalyst, which is inhibited from being poisoned by sulfur.

In accordance with the first aspect of the present invention, a catalyst is provided which can solve the aforementioned problems. In a first embodiment of the present invention, an automotive exhaust catalyst comprises:

an alumina support;

a Ti—Zr composite oxide loaded on the alumina support;

at least one $NO_x$ storage compound selected from the group consisting of alkali metals, alkaline-earth metals and rare-earth elements, loaded on the alumina support; and a noble metal element loaded on the alumina support.

In the first aspect, the entire Ti—Zr composite oxide loaded on the alumina support cannot necessarily be composite oxide, but a part thereof can be composite oxide.

In the first aspect, the Ti—Zr composite oxide is loaded on the alumina support. The loaded Ti—Zr composite oxide can increase the acidity of the alumina support itself. Since $SO_x$ is acidic, it is believed that $SO_x$ is adsorbed less on the alumina support by enlarging the acidity of the alumina support. As a result, in the first aspect, the $NO_x$ storage compound is inhibited from being subjected to the sulfur poisoning, which results from the $SO_x$ adsorption.

Concerning the $NO_x$ in the exhaust gas, a majority of the $NO_x$ is stored in the $NO_x$ storage compound, which is disposed on the alumina support under oxygen-rich atmosphere. The term "oxygen-rich atmosphere" means atmosphere, in which oxygen concentrations are above a stoichiometric point that is required for oxidizing components to be oxidized in the exhaust gas. Then, the exhaust gas is momentarily changed from oxygen-rich to fuel-rich, and the stored $NO_x$ is released and purified by a reaction with HC and CO in the exhaust gas under stoichiometric atmosphere or fuel-lean atmosphere. The term "stoichiometric atmosphere or fuel-lean atmosphere" means atmosphere, in which oxygen concentrations are below the stoichiometric point.

In the first aspect, the loading amount of the Ti—Zr composite oxide preferably falls in a range of from 1 to 80 grams with respect to 100 grams of the alumina support. When the loading amount is less than 1 gram, the resulting automotive exhaust catalyst is poisoned by sulfur, and exhibits degraded $NO_x$ purifying performance after a durability test. When the loading amount is more than 80 grams, the resulting automotive exhaust catalyst has unsatisfactory initial $NO_x$ purifying performance, and exhibits deteriorated oxidation activity.

The Ti—Zr composite oxide preferably contains Ti in a range of from 1/9 to 9/1 by molar ratio with respect to Zr. When Ti and Zr are composited outside the range, the effect (i.e., the alumina-support-acidifying effect) resulting from the composite oxide tends to be produced less.

In the first aspect, the $NO_x$ storage compound is loaded on the alumina support, and is selected from the group consisting of alkali metals, alkaline-earth metals and rare-earth elements. The term "alkali metals" means elements of Group 1A in the periodic table of the elements. As for the alkali metals, it is possible to exemplify lithium (Li), sodium (Na), potassium (K), rubidium (Rb), cesium (Cs), and francium (Fr). The term "alkaline-earth metals" means elements of Group 2A in the periodic table of the elements. As for the alkaline-earth metals, it is possible to exemplify barium (Ba), beryllium (Be), magnesium (Mg), calcium (Ca), and strontium (Sr). The term "rare-earth elements" means scandium (So), yttrium (Y), lanthanum (La), and chemical elements with atomic numbers 58 to 71.

The loading amount of the $NO_x$ storage compound preferably falls in a range of from 0.05 to 0.5 moles with respect to 100 grams of the alumina support. When the loading amount is less than 0.05 moles, the resulting automotive exhaust catalyst has deteriorated $NO_x$ purifying performance. When the loading amount is more than 0.5 moles, the resulting automotive exhaust catalyst exhibits degraded oxidation activity.

In the first aspect, the noble metal element is loaded on the alumina support. The noble metal element can be at least one element selected from the group consisting of platinum (Pt), palladium (Pd), and rhodium (Rh). The loading amount of platinum and/or palladium preferably falls in a range of from 0.1 to 20.0 grams, further preferably from 0.3 to 10.0 grams, with respect to 100 grams of the alumina support. When the loading amount is less than 0.1 gram, the $NO_x$ purifying capability of the resulting automotive exhaust catalyst is degraded initially and after a durability test. When the loading amount is more than 20.0 grams, not only the catalytic effect of platinum and/or palladium is saturated, but also the excessively loaded platinum and/or palladium cannot be utilized effectively.

Whereas, the loading amount of rhodium preferably falls in a range of from 0.001 to 1.0 grams, further preferably from 0.05 to 0.5 grams, with respect to 100 grams of the alumina support. When the loading amount is less than 0.001 gram, the $NO_x$ purifying capability of the resulting automotive exhaust catalyst is degraded initially and after a durability test. When the loading amount is more than 1.0 gram, the thus loaded rhodium adversely affects to deteriorate the catalytic effect of platinum and/or palladium, which are loaded together with rhodium. It is furthermore preferred that rhodium be used together with platinum and/or palladium. Hence, it is preferred to relatively determine the loading amount of rhodium with respect to the loading amount of platinum and/or palladium. For example, the rhodium is preferably loaded in a molar ratio of 1/3 or less, further preferably 1/5 or less, with respect to the platinum and/or the palladium.

In the first aspect, the loading order of the Ti—Zr composite oxide, the $NO_x$ storage compound and the noble metal element is not specified particularly. Note that, however, it is preferred to load the noble metal element on the alumina support after the Ti—Zr composite oxide is loaded thereon in order to highly disperse the noble metal element thereon.

As having been described so far, in accordance with the first aspect, the $NO_x$ storage compound of the resulting automotive exhaust catalyst can be inhibited from being poisoned by sulfur. Accordingly, the resulting automotive exhaust catalyst can keep exhibiting high $NO_x$ purifying performance even after it is subjected to a durability test.

In a second aspect of the present invention, an automotive exhaust catalyst comprises:

a support including a composite oxide, the composite oxide being formed of titanium (Ti) and zirconium (Zr);

at least one $NO_x$ storage compound selected from the group consisting of alkali metals, alkaline-earth metals and rare-earth elements, loaded on the support; and a noble metal element loaded on the support.

In the second aspect, the support includes the Ti—Zr composite oxide. When the support includes composite oxide, which is formed of titanium (Ti) and zirconium (Zr), it is less likely to adsorb the sulfate and sulfite ions thereon than the aluminum supports are. Even if the support adsorbs the sulfate and sulfite ions thereon, the adsorbed sulfate and sulfite ions react with the $NO_x$ storage compound to produce sulfates and sulfite of the $NO_x$ storage compound, which decompose readily at low temperature.

Concerning the $NO_x$ in the exhaust gas, a majority of the $NO_x$ is stored in the $NO_x$ storage compound, which is disposed on the support under oxygen-rich atmosphere. Then, the exhaust gas is momentarily changed from oxygen-rich to fuel-rich, and the stored $NO_x$ is released and purified by a reaction with HC and CO in the exhaust gas under stoichiometric atmosphere or fuel-lean atmosphere.

Thus, in the second aspect of the present automotive exhaust catalyst, the loaded $NO_x$ storage compound and the sulfate and sulfite ions are brought into contact with each other at reduced probability, and the $NO_x$ storage compound is inhibited from being poisoned by sulfur. Whereas, the $NO_x$ storage compound and $NO_x$ are brought into contact with each other at increased probability. Accordingly, the present automotive exhaust catalyst is improved in terms of $NO_x$ purifying capability.

In addition, when the support is formed of the Ti—Zr composite oxide, the support is stabilized by being composited; namely: it is enhanced in terms of heat resistance and acidity. Hence, the support formed of the Ti—Zr composite oxide is effective both in the improvement of catalytic capability and in the reduction of $SO_x$ adsorption. The thus reduced $SO_x$ adsorption eventually results in the prevention of sulfur-poisoning.

In a third aspect of the present invention, an automotive exhaust catalyst comprises:

a support including a composite oxide, the composite oxide being formed of titanium (Ti), zirconium (Zr) and yttrium (Y);

at least one $NO_x$ storage compound selected from the group consisting of alkali metals, alkaline-earth metals and rare-earth elements, loaded on the support; and a noble metal element loaded on the support.

Thus, in the third aspect, the support is made by further compositing the support, employed in the second aspect, with yttrium (Y). Hence, in the support of the third aspect, $TiO_2$ is inhibited from transforming from the anatase type to the rutile type. In other words, the specific surface area of the support is controlled so as not to decrease. As a result, the automotive exhaust catalyst of the third aspect is further improved in terms of heat resistance.

Concerning the $NO_x$ in the exhaust gas, a majority of the $NO_x$ is stored in the $NO_x$ storage compound, which is disposed on the support under oxygen-rich atmosphere. Then, the exhaust gas is momentarily changed from oxygen-rich to fuel-rich, and the stored $NO_x$ is released and purified by a reaction with HC and CO in the exhaust gas under stoichiometric atmosphere or fuel-lean atmosphere.

The compositing ratio of Ti and Zr, which constitutes the support, is not limited in particular. Note that, however, it is preferred that the composite oxide contains the Zr in a range of from 0.2 to 0.5 by molar ratio with respect to the Ti and Zr. When the compositing ratio falls outside the range, the support has a reduced specific surface area, and its acidity (i.e., the number of acidic sites) cannot increase as expected. As a result, the Ti—Zr or Ti—Zr—Y composite oxide support cannot operate and effect the advantages fully.

The Ti—Zr or Ti—Zr—Y composite oxide support can be coated as a carrier layer on a surface of a monolithic support substrate, a metallic support substrate or a pellet-shaped substrate. Moreover, a monolithic support substrate or a pellet-shaped substrate can be formed of the Ti—Zr or Ti—Zr—Y composite oxide support itself.

In the second or third aspect, similarly to the first aspect, the $NO_x$ storage compound is loaded on the Ti—Zr composite oxide support or the Ti—Zr—Y composite oxide support, and is selected from the group consisting of alkali metals, alkaline-earth metals and rare-earth elements. The terms "alkali metals", "alkaline-earth metals" and "rare-earth elements" have the same meanings as aforementioned, and can be exemplified by the elements mentioned earlier.

In the second or third aspect, the loading amount of the $NO_x$ storage compound preferably falls in a range of from 0.05 to 1.0 mole with respect to 100 grams of the Ti—Zr or Ti—Zr—Y composite oxide support. When the loading amount is less than 0.05 moles, the overall $NO_x$ storage capacity is so low that the resulting automotive exhaust catalyst has deteriorated $NO_x$ purifying performance. When the loading amount is more than 1.0 mole, not only the overall $NO_x$ storage capacity is saturated, but also the resulting automotive exhaust catalyst purifies HC so less that HC is emitted in an increased amount.

In the second or third aspect, the noble metal element, loaded on the Ti—Zr or Ti—Zr—Y composite oxide support, can be at least one element selected from the group consisting of platinum (Pt), rhodium (Rh), palladium (Pd), gold (Au) and silver (Ag). Note that it is especially preferred to select Pt. The loading amount of the noble metal elements preferably falls in a range of from 0.2 to 40.0 grams, further preferably from 1.0 to 20.0 grams, with respect to 100 grams of the Ti—Zr or Ti—Zr—Y composite oxide support. Note that, when the loading amount of the noble metal elements is converted to the value with respect to 1 liter of the entire volume of the resulting automotive exhaust catalyst, it preferably falls in a range of from 0.1 to 20.0 grams, further preferably from 0.5 to 10.0 grams. When the loading amount is less than 0.1 gram with respect to 1 liter of the entire volume of the resulting automotive exhaust catalyst, the resulting automotive exhaust catalyst does not exhibit catalytic activities practically. When the loading amount is more than 20.0 grams with respect thereto, the loaded noble metal element does not exhibit its catalytic activities effectively, and the resulting automotive exhaust catalyst is little improved in terms of catalytic activities.

Similarly to the conventional automotive exhaust catalysts, the $NO_x$ storage compound and the noble metal element can be loaded on the Ti—Zr or Ti—Zr—Y composite oxide support by an ordinary process, for instance, an impregnation process, a spraying process or a slurry mixing process, by using their chlorides and nitrates.

In accordance with the second aspect of the present invention, the resulting automotive exhaust catalyst is extremely durable in terms of $NO_x$ purifying performance, because the $NO_x$ storage compound is inhibited from being poisoned by sulfur. In accordance with the third aspect, the resulting automotive exhaust catalyst is further improved in terms of heat resistance, and is furthermore enhanced in terms of durability.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment 600 grams of an alumina or active alumina powder was immersed into 1 liter of a dinitrodiammine platinum aqueous solution having a predetermined concentration, thereby preparing a slurry. The resulting slurry was dried to evaporate the water content, and thereafter was calcinated at 250° C. for 1 hour. Thus, a Pt-loaded alumina or active alumina powder was prepared, in which Pt was loaded in an amount of 2.0 grams with respect to 120 grams of the alumina or active alumina powder.

The Pt-loaded alumina or active alumina powder was added to 2-propanol to mix, and stirred therein at 80° C. for 1 hour. While keeping on stirring the resulting mixture at 80° C., tetraisopropyl titanate and zirconium tetra-n-butoxide was simultaneously added to the mixture. Note that, when simultaneously adding tetraisopropyl titanate and zirconium tetra-n-butoxide, they were not added at one time, but were mixed and added three times fraction by fraction. The resulting mixture was further stirred at 80° C. for 2 hours, and cooled to room temperature. Thereafter, a powder was separated from the cooled mixture by filtration. Finally, the resulting powder was dried, and calcinated at 500° C. for 1 hour. Thus, Ti and Zr elements are loaded on the alumina or active alumina powder as Ti—Zr composite oxide. Note that, on the basis of the metallic conversion, Ti was loaded in an amount of 0.48 moles with respect to 120 grams of the alumina or active alumina powder, and Zr was loaded in an amount of 0.12 moles with respect thereto.

The resulting alumina or active alumina powder with the Pt and Ti—Zr composite oxide loaded was charged into a barium acetate aqueous solution having a predetermined concentration. The resulting mixture was stirred well, and dried to evaporate the water content. Thereafter, the residue was calcinated at 500° C. for 1 hour, thereby preparing an alumina or active alumina powder with Pt, Ti—Zr composite oxide and Ba loaded. Note that, on the basis of the metallic conversion, Ba was loaded in an amount of 0.30 moles with respect to 120 grams of the alumina or active alumina powder.

970 grams of the thus prepared alumina or active alumina powder with Pt, Ti—Zr composite oxide and Ba loaded, 680 grams of an alumina sol including alumina in an amount of 10% by weight, and 290 grams of water were mixed, thereby preparing a slurry for coating. Then, a plurality of honeycomb support substrates formed of cordierite were immersed into the slurry, and thereafter each of them was blown to blow away the slurry in excess. Thereafter, each of the support substrates was dried, and was calcinated at 500 ° C. for 1 hour, thereby preparing a support having a coating layer thereon. Note that the coating layer was formed on the support substrate in an amount of 120 grams with respect to 1 liter of the support substrate. Thus, a plurality of automotive exhaust catalysts were prepared. Note that, as set forth in Table 2 below, Pt was loaded on the support substrate in an amount of 2.0 grams, Ti was loaded in an amount of 0.48 moles, on the basis of the metallic conversion, Zr was loaded in an amount of 0.12 moles, on the basis of the metallic conversion, and Ba was loaded in an amount of 0.30 moles, on the basis of the metallic conversion, respectively, with respect to 1 liter of the support substrate.

Second Preferred Embodiment

Except that Ti was loaded in an amount of 0.30 moles, on the basis of the metallic conversion, and Zr was loaded in an amount of 0.30 moles, on the basis of the metallic conversion, respectively, with respect to I liter of the support substrate, a plurality of automotive exhaust catalysts of the Second Preferred Embodiment were prepared in the same manner as those of the First Preferred Embodiment.

Third Preferred Embodiment

Except that Ti was loaded in an amount of 0.12 moles, on the basis of the metallic conversion, and Zr was loaded in an amount of 0.48 moles, on the basis of the metallic conversion, respectively, with respect to 1 liter of the support substrate, a plurality of automotive exhaust catalysts of the Third Preferred Embodiment were prepared in the same manner as those of the First Preferred Embodiment.

Fourth through Sixth Preferred Embodiments

Except that, instead of the barium acetate aqueous solution, a sodium nitrate aqueous solution, a potassium nitrate aqueous solution, or a cesium nitrate aqueous solution was used, a plurality of automotive exhaust catalysts of the Fourth through Sixth Preferred Embodiments were prepared respectively in the same manner as those of the First Preferred Embodiment. Note that, in the Fourth through Sixth Preferred Embodiments, Na, K or Cs was loaded in an amount of 0.30 moles, respectively, on the basis of the metallic conversion, with respect to 1 liter of the support substrate.

Seventh Preferred Embodiment 600 grams of an alumina or active alumina powder was immersed into 1 liter of a dinitrodiammine platinum aqueous solution having a predetermined concentration, thereby preparing a slurry. The resulting slurry was dried to evaporate the water content, and thereafter was calcinated at 250 ° C. for 1 hour. Thus, a Pt-loaded alumina or active alumina powder was prepared, in which Pt was loaded in an amount of 2.0 grams with respect to 120 grams of the alumina or active alumina powder.

A titania sol and a zirconia sol were added to and stirred with the Pt-loaded alumina or active alumina powder. The resulting mixture was dried to evaporate the water content, and was calcinated at 500 ° C. for 1 hour. Thereafter, in the same manner as set forth in the First Preferred Embodiment, Ba was further loaded on the alumina or active alumina powder with Pt and Ti—Zr composite oxide loaded, and the resulting alumina or active alumina powder with Pt, Ti—Zr composite oxide and Ba loaded was coated on a plurality of honeycomb support substrates formed of cordierite to form a coating layer thereon. Note that Ti and Zr are loaded as Ti—Zr composite oxide on the alumina or active alumina powder wherein Ti was loaded in an amount of 0.30 moles, on the basis of the metallic conversion, and Zr was loaded in an amount of 0.30 moles, on the basis of the metallic conversion, respectively, with respect to 120 grams of the alumina or active alumina powder.

Comparative Example No. 1

Except that tetraisopropyl titanate and tetra-n-butoxide zirconium were not used, a plurality of automotive exhaust catalysts of Comparative Example No. 1 were prepared in the same manner as those of the First Preferred Embodiment. The resulting automotive exhaust catalysts were naturally free from the Ti and Zr loading.

Comparative Example Nos. 2 and 3

Except that either one of tetraisopropyl titanate and tetra-n-butoxide zirconium was used, a plurality of automotive exhaust catalysts of Comparative Example Nos. 2 and 3 were prepared in the same manner as those of the First Preferred Embodiment. Note that, in the automotive exhaust catalysts of Comparative Example No. 2, Ti was loaded in an amount of 0.60 moles, on the basis of the metallic conversion, with respect to 1 liter of the support substrate, and that, in the automotive exhaust catalysts of Comparative Example No. 3, Zr was loaded in an amount of 0.60 moles, on the basis of the metallic conversion, with respect to 1 liter of the support substrate.

Comparative Example No. 4

600 grams of an alumina or active alumina powder, 185 grams of a zirconia powder, and 120 grams of a titania powder were mixed, and a Pt—Ti-and-Zr-loaded powder was prepared in the same manner as set forth in the First Preferred Embodiment.

On the resulting Pt—Ti-and-Zr-loaded alumina or active alumina powder, Ba was loaded in the same manner as set forth in the First Preferred Embodiment. Thereafter, the resulting Pt—Ti—Zr-and-Ba loaded alumina or active alumina powder was made into a slurry. Finally, a plurality of honeycomb support substrates formed of cordierite were immersed into the slurry to form a coating layer thereon, and were made into a plurality of automotive exhaust catalysts of Comparative Example No. 4 in the same manner as set forth in the First Preferred Embodiment. Note that, in the resulting automotive exhaust catalysts, Pt was loaded in an amount of 2.0 grams, Ti was loaded in an amount of 0.30 moles, on the basis of the metallic conversion, Zr was loaded in an amount of 0.30 moles, on the basis of the metallic conversion, and Ba was loaded in an amount of 0.30 moles, on the basis of the metallic conversion, respectively, with respect to 1 liter of the support substrate.

Examination and Evaluation

Each of the automotive exhaust catalysts of the First through Seventh Preferred Embodiments and Comparative Example Nos. 1 through 4 was disposed in a testing apparatus, and was examined for its $NO_x$ conversion in a transition area where a rich-side exhaust gas and a lean-side exhaust gas were flowed alternately for 2 minutes. Hereafter, the term "rich-side exhaust gas" means an exhaust gas, which stems from the combustion of a fuel-rich air-fuel mixture, and the term "lean-side exhaust gas" means an exhaust gas, which stems from the combustion of a fuel-lean air-fuel mixture. Table 1 below sets forth the compositions of the rich-side and lean-side model exhaust gases. Note that the rich-side and lean-side model exhaust gases were flowed at a rate of 2 liter/minute. The results of this $NO_x$ conversion examination are summarized as "I.C. (i.e., Initial Conversion)" in Table 2 below. Note that the temperature of the inlet exhaust gases was changed to three different temperatures, e.g., 250° C., 300° C. and 350° C. Here, the $NO_x$ conversion is defined by the following equation:

$NO_x$ Conversion (%)={(1−$NO_x$ Concentration in Outlet Exhaust Gas)/($NO_x$ Concentration in Inlet Exhaust Gas)}×100

Then, each of the automotive exhaust catalysts was subjected to a durability test. In the durability test, a rich-side exhaust gas including $SO_2$ in an amount of 100 ppm was flowed for 4 minutes, and a lean-side exhaust gas including $SO_2$ in an amount of 100 ppm was flowed for 1 minute, thereby constituting one degradation cycle. Each of the automotive exhaust catalyst was exposed to 60 degradation cycles. Note that, in the durability test, the temperature of the inlet exhaust gases was fixed at 550° C. Thereafter, each of the automotive exhaust catalysts was examined for its $NO_x$ conversion in the transition area in the same manner as described above. The results of this $NO_x$ conversion examination are summarized as "C.A.D.T. (i.e., Conversion after Durability Test)" in Table 2.

TABLE 1

| Composition | $O_2$ (%) | NO (ppm) | $C_3H_6$ (ppm) | CO (%) | $H_2$ (%) | $N_2$ |
|---|---|---|---|---|---|---|
| Lean-Side Model Gas | 7.86 | 570 | 1170 | 0.19 | 0.045 | balance |
| Rich-Side Model Gas | 0.25 | 0 | 710 | 1.07 | 0.250 | balance |

TABLE 2

| | Loading Amount of Metallic Component (with respect to 1 liter of Support Substrate) | | | | | | NOx Conversion (%) in Transition Area | | | | | |
|---|---|---|---|---|---|---|---|---|---|---|---|---|
| | | | | | | | | 250° C. | | 300° C. | | 350° C. | |
| | Pt (gram) | Ti (mole) | Zr (mole) | Ba (mole) | Na (mole) | K (mole) | Cs (mole) | I.C. | C.A.D.T. | I.C. | C.A.D.T. | I.C. | C.A.D.T. |
| 1st Pref. Embodiment | 2.0 | 0.48 | 0.12 | 0.30 | — | — | — | 94 | 73 | 98 | 84 | 96 | 77 |
| 2nd Pref. Embodiment | 2.0 | 0.30 | 0.30 | 0.30 | — | — | — | 95 | 72 | 98 | 85 | 96 | 82 |

TABLE 2-continued

| | Loading Amount of Metallic Component (with respect to 1 liter of Support Substrate) | | | | | | NOx Conversion (%) in Transition Area | | | | | |
|---|---|---|---|---|---|---|---|---|---|---|---|---|
| | Pt | Ti | Zr | Ba | Na | K | Cs | 250° C. | | 300° C. | | 350° C. | |
| | (gram) | (mole) | (mole) | (mole) | (mole) | (mole) | (mole) | I.C. | C.A.D.T. | I.C. | C.A.D.T. | I.C. | C.A.D.T. |
| 3rd Pref. Embodiment | 2.0 | 0.12 | 0.48 | 0.30 | — | — | — | 96 | 85 | 97 | 88 | 94 | 77 |
| 4th Pref. Embodiment | 2.0 | 0.30 | 0.30 | — | 0.30 | — | — | 94 | 69 | 97 | 80 | 95 | 72 |
| 5th Pref. Embodiment | 2.0 | 0.30 | 0.30 | — | — | 0.30 | — | 94 | 67 | 96 | 78 | 95 | 70 |
| 6th Pref. Embodiment | 2.0 | 0.30 | 0.30 | — | — | — | 0.30 | 93 | 67 | 96 | 79 | 94 | 69 |
| 7th Pref. Embodiment | 2.0 | 0.30 | 0.30 | 0.30 | — | — | — | 93 | 71 | 95 | 81 | 93 | 74 |
| Comp. Ex. No. 1 | 2.0 | — | — | 0.30 | — | — | — | 86 | 60 | 82 | 65 | 70 | 60 |
| Comp. Ex. No. 2 | 2.0 | 0.60 | — | 0.30 | — | — | — | 94 | 61 | 95 | 70 | 93 | 64 |
| Comp. Ex. No. 3 | 2.0 | — | 0.60 | 0.30 | — | — | — | 92 | 65 | 90 | 73 | 84 | 64 |
| Comp. Ex. No. 4 | 2.0 | 0.30 | 0.30 | 0.30 | — | — | — | 87 | 66 | 80 | 72 | 71 | 65 |

(Note)
1. "I.C." stands for "Initial Conversion".
2. "C.A.D.T." stands for "Conversion after Durability Test".

It is understood from Table 2 that the $NO_x$ conversions after the durability test, which were exhibited by the automotive exhaust catalysts of the First through Seventh Preferred Embodiments, were degraded less with respect to the initial $NO_x$ conversions. Specifically, when comparing the degree of $NO_x$ conversion degradation, the values, which were exhibited by the First through Seventh Preferred Embodiments, were smaller than the values, which were exhibited by Comparative Example Nos. 1 through 4. This result implies that the automotive exhaust catalysts of the First through Seventh Preferred Embodiments were less poisoned by sulfur during the durability test than those of Comparative Example Nos. 1 through 4.

Comparing the First through Seventh Preferred Embodiments with Comparative Example Nos. 1 through 4, the automotive exhaust catalysts were inhibited less from being poisoned by sulfur when Ti or Zr was loaded independently. Further, the automotive exhaust catalysts were inhibited less from being poisoned by sulfur when Ti and Zr were simultaneously loaded as independent oxides. Thus, it is apparent that the automotive exhaust catalysts can be inhibited from being poisoned by sulfur eventually when Ti and Zr are loaded as composite oxide.

Eighth Preferred Embodiment

A titania ($TiO_2$) sol and a zirconia ($ZrO_2$) sol were mixed so that the molar ratio of Zr was 0.2 (i. e., Zr/(Ti+Zr)=0.2). The resulting sol mixture was stirred, dried at 80° C., and calcinated at 500° C. for 5 hours, thereby preparing a powdered support, which included Ti—Zr composite oxide.

A predetermined amount of the powdered support was immersed into a dinitrodiammine platinum aqueous solution having a predetermined concentration. The resulting mixture was stirred for 5 hours, dried to evaporate the water content, and calcinated at 300° C. in air for 3 hours, thereby loading platinum (Pt) on the powdered support. The loading amount of Pt was 2.0 grams with respect to 100 grams of the powdered support. Note that 100 grams of the powdered support is equivalent to 1 liter thereof.

Then, the powdered support with Pt loaded was immersed into a barium acetate aqueous solution having a predetermined concentration. The resulting mixture was stirred for 5 hours, dried to evaporate the water content, and calcinated at 300° C. in air for 3 hours, thereby loading barium (Ba), working as the $NO_x$ storage compound, on the Pt-loaded powdered support. The loading amount of Ba was 0.3 moles with respect to 100 grams of the powdered support.

Finally, the Pt-and-Ba-loaded powdered support was treated by a hydrogen gas flow at 500° C. for 3 hours, thereby preparing a powdered automotive exhaust catalyst of the Eighth Preferred Embodiment.

Ninth Preferred Embodiment

Except that the titania sol and the zirconia sol were mixed to prepare a powdered support, in which the molar ratio of Zr was 0.5 (i.e., Zr/(Ti+Zr)=0.5), a powdered automotive exhaust catalyst of the Ninth Preferred Embodiment was prepared in the same manner as recited in the Eighth Preferred Embodiment.

Tenth Preferred Embodiment

Except that the titania sol and the zirconia sol were mixed to prepare a powdered support, in which the molar ratio of Zr was 0.8 (i.e., Zr/(Ti+Zr)=0.8), a powdered automotive exhaust catalyst of the Tenth Preferred Embodiment was prepared in the same manner as recited in the Eighth Preferred Embodiment.

Eleventh Preferred Embodiment

Except that not only the titania sol and the zirconia sol but also extra yttrium nitrate were mixed to prepare a powdered support, in which the molar ratio of Zr was 0.2 with respect to the sum of Ti and Zr (i.e., Zr/(Ti+Zr)=0.2), and yttrium (Y) was further included in an amount of 10% by mole, a powdered automotive exhaust catalyst of the Eleventh Preferred Embodiment was prepared in the same manner as recited in the Eighth Preferred Embodiment. The powdered support of this embodiment included Ti—Zr—Y composite oxide.

Twelfth Preferred Embodiment

Except that not only the titania sol and the zirconia sol but also extra yttrium nitrate were mixed to prepare a powdered support, in which the molar ratio of Zr was 0.5 with respect to the sum of Ti and Zr (i.e., Zr/(Ti+Zr)=0.5), and yttrium (Y) was further included in an amount of 10% by mole, a powdered automotive exhaust catalyst of the Twelfth Preferred Embodiment was prepared in the same manner as recited in the Eighth Preferred Embodiment.

Thirteenth Preferred Embodiment

Except that not only the titania sol and the zirconia sol but also extra yttrium nitrate were mixed to prepare a powdered support, in which the molar ratio of Zr was 0.8 with respect to the sum of Ti and Zr (i.e., Zr/(Ti+Zr)=0.8), and yttrium (Y) was further included in an amount of 10% by mole, a powdered automotive exhaust catalyst of the Thirteenth Preferred Embodiment was prepared in the same manner as recited in the Eighth Preferred Embodiment.

Fourteenth Preferred Embodiment

Titanium tetrachloride, zirconyl nitrate, and yttrium nitrate were mixed and stirred so as to produce precipitate, in which the molar ratio of Zr was 0.2 with respect to the sum of Ti and Zr (i.e., Zr/(Ti+Zr)=0.2), and in which yttrium (Y) was further included in an amount of 10% by mole. Note that the precipitate was produced by a co-precipitation process, in which urea and ammonium carbonate were used as neutralizing agents. The resulting precipitate was washed, dried at 80° C., and calcinated at 500° C. for 5 hours, thereby preparing a powdered support, which included Ti—Zr—Y composite oxide.

Finally, Pt and Ba were further loaded on the powdered support in the same manner as set forth in the Eighth Preferred Embodiment, thereby preparing a powdered automotive exhaust catalyst of the Fourteenth Preferred Embodiment.

Fifteenth Preferred Embodiment

Except that titanium tetrachloride, zirconyl nitrate, and yttrium nitrate were mixed and stirred so as to produce precipitate, in which the molar ratio of Zr was 0.5 with respect to the sum of Ti and Zr (i.e., Zr/(Ti+Zr)=0.5), and in which yttrium (Y) was further included in an amount of 10% by mole, a powdered automotive exhaust catalyst of the Fifteenth Preferred Embodiment was prepared in the same manner as set forth in the Fourteenth Preferred Embodiment.

Sixteenth Preferred Embodiment

Except that titanium tetrachloride, zirconyl nitrate, and yttrium nitrate were mixed and stirred so as to produce precipitate, in which the molar ratio of Zr was 0.8 with respect to the sum of Ti and Zr (i.e., Zr/(Ti+Zr)=0.8), and in which yttrium (Y) was further included in an amount of 10% by mole, a powdered automotive exhaust catalyst of the Sixteenth Preferred Embodiment was prepared in the same manner as set forth in the Fourteenth Preferred Embodiment.

Comparative Example No. 5

A predetermined amount of an alumina powder was immersed into a dinitrodiammine platinum aqueous solution having a predetermined concentration. The resulting mixture was stirred for 5 hours, dried to evaporate the water content, and calcinated at 300° C. in air for 3 hours, thereby loading platinum (Pt) on the alumina powder. The loading amount of Pt was 2.0 grams with respect to 100 grams of the alumina powder.

Then, the alumina powder with Pt loaded was immersed into a barium acetate aqueous solution having a predetermined concentration. The resulting mixture was stirred for 5 hours, dried to evaporate the water content, and calcinated at 300° C. in air for 3 hours, thereby loading barium (Ba), working as the $NO_x$ storage compound, on the Pt-loaded alumina powder. The loading amount of Ba was 0.3 moles with respect to 100 grams of the alumina powder.

Finally, the Pt-and-Ba-loaded alumina powder was treated by a hydrogen gas flow at 500° C. for 3 hours, thereby preparing a powdered automotive exhaust catalyst of Comparative Example No. 5.

Comparative Example No. 6

Except that a powdered support was formed of a $TiO_2$ powder alone, a powdered automotive exhaust catalyst of Comparative Example No. 6 was prepared in the same manner as recited in the Eighth Preferred Embodiment.

Comparative Example No. 7

Except that a powdered support was formed of a $ZrO_2$ powder alone, a powdered automotive exhaust catalyst of Comparative Example No. 7 was prepared in the same manner as recited in the Eighth Preferred Embodiment.

Table 3 below summarizes the compositions, etc., of the thus prepared powdered automotive exhaust catalysts of the Eighth through Sixteenth Preferred Embodiments as well as Comparative Example Nos. 5 through 7.

Examination and Evaluation

Each of the powdered automotive exhaust catalysts of the Eighth through Sixteenth Preferred Embodiments and Comparative Example Nos. 5 through 7 was examined for its initial $NO_x$ purifying performance as well as its $NO_x$ purifying performance after a durability test. Each of them was pelletized by an ordinary process. Each of the pelletized automotive exhaust catalysts was weighed out by 0.5 grams, disposed in a testing apparatus, and was examined for its $NO_x$ conversion in a transition area where a rich-side model exhaust gas and a lean-side model exhaust gas were flowed alternately for 2 minutes. Table 4 below sets forth the compositions of the rich-side and lean-side model exhaust gases. Note that the rich-side and lean-side model exhaust gases were flowed at a rate of 2 liter/minute. The results of this $NO_x$ conversion examination are summarized as "Initial $NO_x$ Conversion" in Table 3. Note that the temperature of the inlet model exhaust gases was changed to three different temperatures, e.g., 250° C., 300° C. and 350° C. Here, the $NO_x$ conversion is defined by the following equation:

$NO_x$ Conversion (%)={(1−$NO_x$ Concentration in Outlet Exhaust Gas)/($NO_x$ Concentration in Inlet Exhaust Gas)}×100

Then, each of the pelletized automotive exhaust catalysts was subjected to a durability test. In the durability test, a lean-side model exhaust gas including $SO_2$ in an amount of 400 ppm was flowed for 4 minutes, and a rich-side model exhaust gas including $SO_2$ in an amount of 400 ppm was flowed for 1 minute, thereby constituting one degradation cycle. Note that, in this durability test, each of the pelletized automotive exhaust catalysts was weighed out by 1 gram, and was exposed to 15 degradation cycles. Also note that, in the durability test, the temperature of the inlet model exhaust gases was fixed at 600° C. Thereafter, each of the pelletized automotive exhaust catalysts was examined for its $NO_x$ conversion in the transition area in the same manner as described above. The results of this $NO_x$ conversion examination are summarized as "$NO_x$ Conversion after Durability Test" in Table 3.

that the heat resistance of the pelletized automotive exhaust catalysts of the Eleventh through Sixteenth Preferred Embodiments were improved by further compositing the Ti—Zr composite oxide support with yttrium.

Moreover, the comparison of the test results exhibited by the preferred embodiments reveals the following; namely:

TABLE 3

| | Powdered Support Composition (Molar Ratio) | | | | Pt Loading Amount | Ba Loading Amount | Initial NOx Conversion (%) | | | NOx Conversion after Durability Test (%) | | |
|---|---|---|---|---|---|---|---|---|---|---|---|---|
| | Ti | Zr | Y | Al | Zr/(Ti + Zr) | (gram) | (mole) | 250° C. | 300° C. | 350° C. | 250° C. | 300° C. | 350° C. |
| 8th Pref. Embodiment | 0.8 | 0.2 | — | — | 0.2 | 2.0 | 0.3 | 90 | 91 | 88 | 62 | 51 | 44 |
| 9th Pref. Embodiment | 0.5 | 0.5 | — | — | 0.5 | 2.0 | 0.3 | 88 | 90 | 87 | 61 | 50 | 45 |
| 10th Pref. Embodiment | 0.2 | 0.8 | — | — | 0.8 | 2.0 | 0.3 | 87 | 86 | 82 | 54 | 48 | 42 |
| 11th Pref. Embodiment | 0.72 | 0.18 | 0.1 | — | 0.2 | 2.0 | 0.3 | 89 | 92 | 90 | 65 | 56 | 47 |
| 12th Pref. Embodiment | 0.45 | 0.45 | 0.1 | — | 0.5 | 2.0 | 0.3 | 89 | 92 | 91 | 63 | 52 | 45 |
| 13th Pref. Embodiment | 0.18 | 0.72 | 0.1 | — | 0.8 | 2.0 | 0.3 | 85 | 85 | 82 | 59 | 50 | 43 |
| 14th Pref. Embodiment | 0.72 | 0.18 | 0.1 | — | 0.2 | 2.0 | 0.3 | 94 | 95 | 88 | 65 | 56 | 47 |
| 15th Pref. Embodiment | 0.45 | 0.45 | 0.1 | — | 0.5 | 2.0 | 0.3 | 95 | 95 | 89 | 67 | 57 | 48 |
| 16th Pref. Embodiment | 0.18 | 0.72 | 0.1 | — | 0.8 | 2.0 | 0.3 | 88 | 86 | 83 | 60 | 54 | 46 |
| Comp. Ex. No. 5 | — | — | — | 1.0 | — | 2.0 | 0.3 | 93 | 91 | 89 | 34 | 27 | 23 |
| Comp. Ex. No. 6 | 1.0 | — | — | — | 0 | 2.0 | 0.3 | 88 | 90 | 86 | 40 | 32 | 24 |
| Comp. Ex. No. 7 | — | 1.0 | — | — | 1.0 | 2.0 | 0.3 | 79 | 72 | 68 | 28 | 22 | 18 |

TABLE 4

| Composition | $O_2$ (%) | NO (ppm) | $C_3H_6$ (ppm) | CO (%) | $H_2$ (%) | $N_2$ |
|---|---|---|---|---|---|---|
| Lean-Side Model Gas | 7.86 | 570 | 1170 | 0.19 | 0.045 | balance |
| Rich-Side Model Gas | 0.25 | 0 | 710 | 1.07 | 0.250 | balance |

It is appreciated from Table 3 that the pelletized automotive exhaust catalysts of the Eighth through Sixteenth Preferred Embodiments were better than those of Comparative Example Nos. 5 through 7 in terms of the $NO_x$ purifying performance after the durability test. This advantage is believed to result from the fact that the Ti—Zr composite oxide support is less likely to adsorb $SO_x$ thereon than the alumina support.

Further, the pelletized automotive exhaust catalysts of the Eighth through Tenth Preferred Embodiments were superior to those of Comparative Example Nos. 6 and 7 in terms of the initial $NO_x$ conversion and the $NO_x$ conversion after the durability test. This advantage was apparently produced by making the support from the Ti—Zr composite oxide. For instance, it is believed that the heat resistance and acidity of the pelletized automotive exhaust catalysts of the Eighth through Tenth Preferred Embodiments were enhanced by the Ti—Zr composite oxide support, and the enhanced properties resulted in the advantage.

Furthermore, it is understood that, by further compositing the Ti—Zr composite oxide powder with yttrium, the pelletized automotive exhaust catalysts of the Eleventh through Sixteenth Preferred Embodiments were upgraded in terms of the $NO_x$ conversion after the durability test. It is believed when the Ti—Zr composite oxide support was made from the $TiO_2$ sol and the $ZrO_2$ sol (e.g., Eighth through Tenth Preferred Embodiments), the larger the molar ratio of Zr (i.e., Zr/(Ti+Zr)) was, the smaller $NO_x$ conversion the pelletized automotive exhaust catalysts exhibited. It is apparent that an optimum result was produced when the molar ratio of Zr fell in the range of from 0.2 to 0.5 especially. Even when the Ti—Zr—Y composite oxide support was made by the co-precipitation process (e.g., Fourteenth through Sixteenth Preferred Embodiments), it is similarly appreciated that an optimum advantage was effected when the molar ratio of Zr fell in the range of from 0.2 to 0.5 especially.

Having now fully described the present invention, it will be apparent to one of ordinary skill in the art that many changes and modifications can be made thereto without departing from the spirit or scope of the present invention as set forth herein including the appended claims.

What is claimed is:

1. A process for purifying carbon monoxide, hydrocarbons and nitrogen oxides at the stoichiometric point or in exhaust gases in oxygen-rich atmosphere, thereby purifying the exhaust gases, the process comprising the step of:

bringing exhaust gases at stoichiometric point or in oxygen-rich atmosphere, whose oxygen concentration is more than required for oxidizing the components to be oxidized therein, into contact with a catalyst:
the catalyst comprising:
an alumina support;
a Ti—Zr composite oxide loaded on said alumina support;
at least one $NO_x$ storage compound selected from the group consisting of alkali metals and alkaline-earth metals loaded on said alumina support; and a noble metal element loaded on said alumina support, whereby said nitrogen oxides in said exhaust gases are adsorbed to said $NO_x$ storage compound on said alumina support under an oxygen-rich atmosphere in which oxygen concentration is above the stoichiometric point that is required for oxidizing components to be oxidized in said exhaust gases, and said adsorbed nitrogen oxides are released and purified by a reaction with said hydrocarbons and carbon monoxide in said exhaust gases under a stoichiometric atmosphere or a reduction atmosphere in which oxygen concentration is below the stoichiometric point, and whereby said Ti—Zr composite oxide inhibits said $NO_x$ storage compound from reacting with sulfur oxides contained in said exhaust gases to form sulfates and sulfites.

2. The process according to claim 1, wherein said Ti—Zr composite oxide is loaded in an amount of from 1 to 80 grams with respect to 100 grams of said alumina support.

3. The process according to claim 1, wherein said Ti—Zr composite oxide contains Ti in a range of from 1/9 to 9/1 by molar ratio with respect to Zr.

4. The process according to claim 1, wherein said $NO_x$ storage compound is loaded in an amount of from 0.05 to 0.5 moles with respect to 100 grams of said alumina support.

5. The process according to claim 1, wherein said noble metal element is at least one element selected from the group consisting of platinum (Pt), palladium (Pd), and rhodium (Rh).

6. The process according to claim 5, wherein said noble metal element is at least one element selected from the group consisting of Pt and Pd, and loaded in an amount of from 0.1 to 20.0 grams with respect to 100 grams of said alumina support.

7. The process according to claim 5, wherein said noble metal catalyst is Rh, and loaded in an amount of from 0.001 to 1.0 gram with respect to 100 grams of said alumina support.

8. The process according to claim 5, wherein said Rh is loaded in an amount of from 0.001 to 1.0 gram, and said Pt and/or said Pd is loaded in an amount of from 0.1 to 20.0 grams with respect to 100 grams of said alumina support.

9. The process according to claim 8, wherein said Rh is loaded in a molar ratio of 1/3 or less with respect to a loading amount of said Pt and/or Pd.

10. The process according to claim 1, wherein said noble metal element is loaded on said alumina support after loading said Ti—Zr composite oxide.

11. A process for purifying carbon monoxide, hydrocarbons and nitrogen oxides at the stoichiometric point or in exhaust gases in oxygen-rich atmosphere, thereby purifying the exhaust gases, the process comprising the step of:

bringing exhaust gases at the stoichiometric point or in oxygen-rich atmosphere, whose oxygen concentration is more than required for oxidizing the components to be oxidized therein, into contact with a catalyst:

the catalyst comprising:

a support including a composite oxide, the composite oxide being formed of titanium (Ti), zirconium (Zr) and yttrium (Y);

at least one $NO_x$ storage compound selected from the group consisting of alkaline-earth metals loaded on said support; and a noble metal element loaded on said support, whereby said nitrogen oxides in said exhaust gases are adsorbed to said $NO_x$ storage compound on said alumina support under an oxygen-rich atmosphere in which oxygen concentration is above the stoichiometric point that is required for oxidizing components to be oxidized in said exhaust gases, and said adsorbed nitrogen oxides are released and purified by a reaction with said hydrocarbons and carbon monoxide in said exhaust gases under a stoichiometric atmosphere or a reduction atmosphere in which oxygen concentration is below the stoichiometric point, and whereby said Ti—Zr—Y composite oxide inhibits said $NO_x$ storage compound from reacting with sulfur oxides contained in said exhaust gases to form sulfates and sulfites.

12. A process for purifying carbon monoxide, hydrocarbons and nitrogen oxides at the stoichiometric point or in exhaust gases in oxygen-rich atmosphere, thereby purifying the exhaust gases, the process comprising the step of:

bringing exhaust gases at the stoichiometric point or in oxygen-rich atmosphere, whose oxygen concentration is more than required for oxidizing the components to be oxidized therein, into contact with a catalyst:

the catalyst comprising:

a support including a composite oxide, the composite oxide being formed of titanium (Ti) and zirconium (Zr);

at least one $NO_x$ storage compound selected from the group consisting of alkali metals and alkaline-earth metals loaded on said support; and a noble metal element loaded on said support, whereby said nitrogen oxides in said exhaust gases are adsorbed to said $NO_x$ storage compound on said alumina support under an oxygen-rich atmosphere in which oxygen concentration is above the stoichiometric point that is required for oxidizing components to be oxidized in said exhaust gases, and said adsorbed nitrogen oxides are released and purified by a reaction with said hydrocarbons and carbon monoxide in said exhaust gases under a stoichiometric atmosphere or a reduction atmosphere in which oxygen concentration is below the stoichiometric point, and whereby said Ti—Zr composite oxide inhibits said $NO_x$ storage compound from reacting with sulfur oxides contained in said exhaust gases to form sulfates and sulfites.

13. The process according to claim 12, wherein said composite oxide contains said Zr in a range of from 0.2 to 0.5 by molar ratio with respect to said Ti and Zr.

14. The process according to claim 12, wherein said support is coated as a carrier layer on a surface of a monolithic support substrate, a metallic support substrate or a pellet-shaped substrate.

15. The process according to claim 12, wherein said support forms a monolithic support substrate or a pellet-shaped substrate.

16. The process according to claim 12, wherein said $NO_x$ storage compound is loaded in an amount of from 0.05 to 1.0 mole with respect to 100 grams of said support.

17. The process according to claim 12, wherein said noble metal element is at least one element selected from the group consisting of platinum (Pt), rhodium (Rh), palladium (Pd), gold (Au) and silver (Ag).

18. The process according to claim 12, wherein said noble metal element is loaded in an amount of from 0.2 to 40.0 grams with respect to 100 grams of said support.

* * * * *